Aug. 12, 1958 D. E. THOMAS 2,847,645
NULL-TYPE TRANSISTOR ALPHA MEASURING SET
Filed Nov. 23, 1955 2 Sheets-Sheet 1

INVENTOR
D. E. THOMAS
BY
R. B. Ardis
ATTORNEY

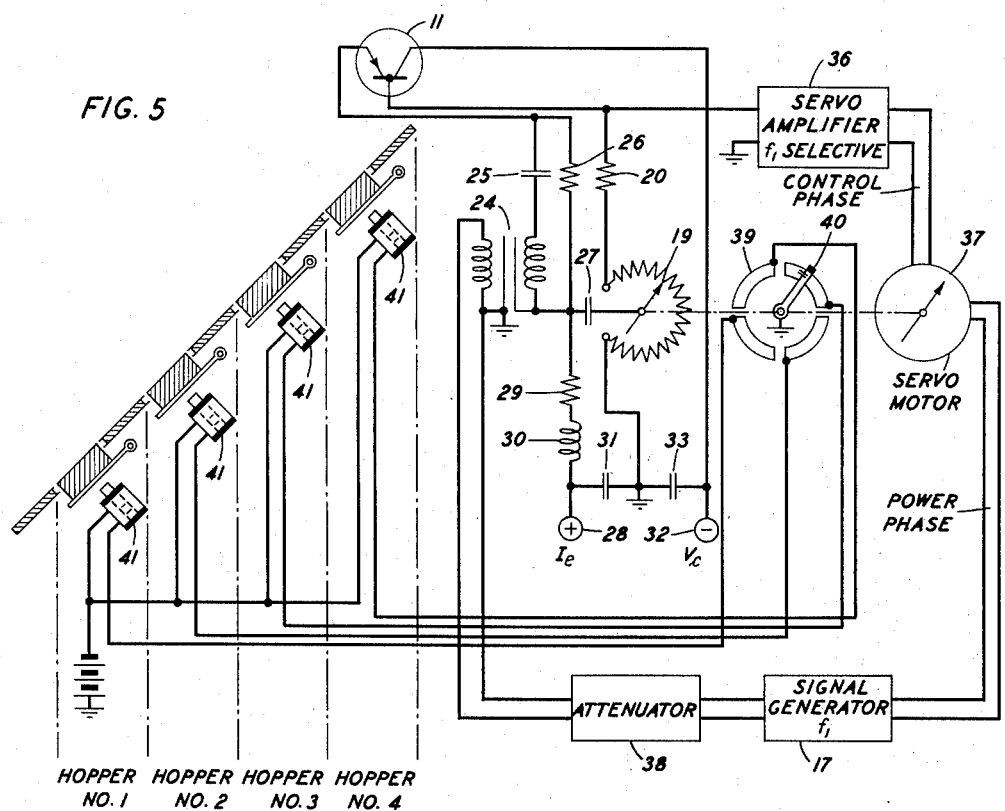
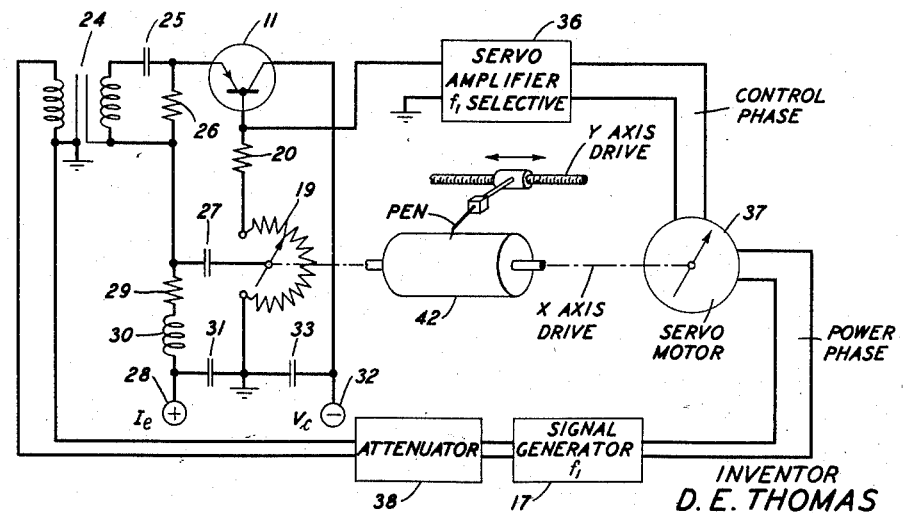

UNITED STATES PATENT OFFICE 2,847,645
Patented Aug. 12, 1958

2,847,645

NULL-TYPE TRANSISTOR ALPHA MEASURING SET

Donald E. Thomas, Madison, N. J., assignor to Bell Telephone Laboratories, Incorporated, New York, N. Y., a corporation of New York Application November 23, 1955, Serial No. 548,580

8 Claims. (Cl. 324—158)

This invention relates generally to the measurement of the electrical operating characteristics of transistors and more particularly to the measurement of the current amplification factor (alpha) of transistors.

A principal object of the invention is to increase the accuracy of transistor current amplification factor measurements.

Another and more particular object is to free the accuracy of transistor current amplification factor measurements from dependence upon the accuracy with which the magnitude of a current or a voltage can be determined by a meter reading.

Still another object is to free the accuracy of transistor current amplification factor measurements from dependence upon constancy in signal generator level.

A further object is to permit precise measurement of transistor current amplification factors at extremely low emitter current levels.

An additional object is to provide automation of transistor current amplification factor measurement.

The usual transistor alpha measuring set, particularly for junction transistors, requires first the adjustment of a standard emitter signal current, as determined by the indicating meter of the measuring set, and then the reading of the potential across a calibrated resistance. If alpha itself is being measured, this latter resistance is in the transistor collector circuit and, if the quantity $1-\alpha$ is being measured, the resistance is in the base circuit. The technique requires two separate and distinct meter readings, usually at different times for the reason that a single meter is normally used for both calibration and measurement. Extreme constancy of signal generator level is, therefore, a requisite. In addition, since alpha and $1-\alpha$ are determined by means of a meter reading, the maximum precision of the determination is usually not better than one-half of one percent.

The above limitations in measuring the current amplification factor of a transistor are substantially eliminated by the present invention. In accordance with a principal feature of the invention, the fixed terminals of a potentiometer are connected to the collector and base electrodes, respectively, of the transistor being tested, an A.-C. signal generator is connected between the transistor emitter electrode and the potentiometer movable contact, and a null-reading voltage measuring device is connected between the transistor collector and base electrodes substantially in parallel with the potentiometer resistance arm. When the position of the movable contact is adjusted to give a null reading on the voltage measuring means, both alpha and $1-\alpha$ are functions of that position. In general, alpha is given by the ratio of the resistance between the transistor base electrode and the movable contact to the total resistance of the potentiometer and $1-\alpha$ is given by the ratio of the resistance between the movable contact and the transistor collector electrode to the same total resistance. Since the voltage measuring means is used only to provide a null reading, measuring accuracy is freed from dependence upon the accuracy with which a meter can be read. The potentiometer in the collector-base path of the transistor, which provides the desired alpha reading, is capable of being calibrated with much greater precision than a meter and, furthermore, remains calibrated once it has been calibrated. Signal level fluctuations fail to affect the accuracy of the measurement, since the position of null balance is independent of signal level over a considerable range of signal level.

The present invention also possesses other advantages not made possible by the use of the transistor alpha measuring techniques found in the prior art. In accordance with another feature of the invention, a high-gain frequency-selective amplifier tuned to the frequency of the A.-C. signal generator and having a suitable output indicating meter may be used as the null-reading voltage measuring device. The signal to noise ratio of the null indicator is thereby improved and the detection of extremely low level signals is permitted. In accordance with still another feature of the invention, servo techniques may be employed effectively to balance the null detector automatically. In accordance with this feature of the invention, a two-phase A.-C. servo motor has its shaft position-coupled to the movable contact of the potentiometer. The signal generator supplies both power to the reference or power phase of the servo motor and a signal between the transistor emitter electrode and the potentiometer movable contact. The control phase of the servo motor is fed by the output of a frequency-selective servo amplifier whose input is connected across the two fixed terminals of the potentiometer. The signal between the base and emitter electrodes, amplified by the servo amplifier, drives the motor until the potentiometer setting is such that this signal becomes zero, thus giving an automatic indication of the value of alpha in terms of the setting of the potentiometer.

A more complete understanding of the invention may be obtained from a study of the following detailed description of several specific embodiments. In the drawings:

Fig. 5 shows an embodiment of the invention adapted for automatic sorting of transistors in accordance with values of alpha; and Fig. 6 shows an embodiment of the invention adapted to produce a permanent graph of the alpha characteristic of a transistor as a function of any selected operating parameter or ambient condition.

Figure 1:
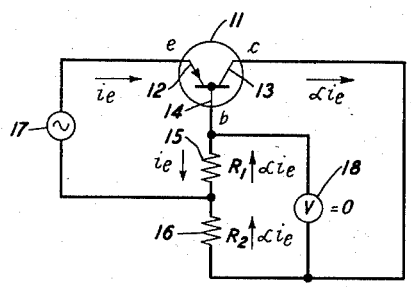
Fig. 1 illustrates the basic A.-C. alpha measuring circuit featured by the present invention.

The embodiment of the invention shown in Fig. 1 includes a transistor 11 having an emitter electrode 12, a collector electrode 13, and a base electrode 14. In the conventional transistor symbol shown, emitter electrode 12 is indicated by the arrowhead, and the direction of positive emitter current flow is indicated by the direction of the arrow. Thus, a transistor of the p-n-p type is indicated by an emitter arrow pointing toward the base, and a transistor of the n-p-n type is indicated by an emitter arrow pointing away from the base. The transistors shown in this and succeeding figures are p-n-p transistors, by way of example, but it should be understood that the invention is applicable to measuring the alphas of transistors of the opposite conductivity type as well. For transistors of the n-p-n type, currents flow in directions opposite to those shown in the drawings and all D.-C. bias supply polarities should be reversed.

The circuitry in the embodiment of the invention shown in Fig. 1 omits provision for D.-C. biasing for the sake of simplicity. The A.-C. circuit, however, includes a resistor 15, having a resistance $R_1$, and a resistor 16, having a resistance $R_2$, connected in series between base electrode 14 and collector electrode 13. An A.-C. signal source 17 is connected between emitter electrode 12 and the junction of resistors 15 and 16, and a voltmeter 18 is connected between base electrode 14 and collector electrode 13 in parallel with the series combination of resistors 15 and 16. The frequency of A.-C. signal generator 17 is preferably in the audio range in order both to avoid reactance effects and to be well below the common emitter cut-off frequency of the transistor. In addition, the current supplied by source 17 should be sufficiently small in comparison with the D.-C. emitter biasing current for transistor 11 as not to overload the transistor.

In the embodiment of the invention illustrated in Fig. 1, if resistors 15 and 16 are adjusted so that the potential from collector electrode 13 to base electrode 14, as indicated by voltmeter 18, is zero and if $R_1+R_2$ is small in comparison with the internal collector impedance of transistor 11, the current flowing in resistor 16 is the collector current $\alpha i_e$ and the potential across resistor 16 is $R_2 \alpha i_e$, where $\alpha$ is the current amplification factor of transistor 11 and $i_e$ is the emitter current flowing into transistor 11 from signal source 17. The current flowing in resistor 15, on the other hand, is the base current $i_e - \alpha i_e$ and the potential across resistor 15 is $R_1(i_e - \alpha i_e)$. Resistors 15 and 16 have one terminal in common. When their other terminals are at the same potential, as indicated by a zero reading on voltmeter 18, then:

$$R_1 i_e - R_1 \alpha i_e = R_2 \alpha i_e \quad (1)$$

or $$\alpha = \frac{R_1}{R_1 + R_2} \quad (2)$$

and $$1 - \alpha = \frac{R_2}{R_1 + R_2} \quad (3)$$

Figure 2:
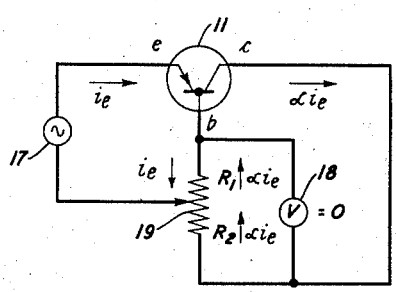
Fig. 2 illustrates a simplified embodiment of the invention, using a potentiometer instead of the separate resistances shown in Fig. 1.

If $R_1+R_2$ is made the total resistance, $R_p$, of a fixed resistance potentiometer 19 and the movable contact of the potentiometer is made the common point of $R_1$ and $R_2$, as shown in Fig. 2, then:

$$\alpha = \frac{R_1}{R_p} \quad (4)$$

and $$1 - \alpha = \frac{R_2}{R_p} \quad (5)$$

In Fig. 2, if the resistance of potentiometer 19 is linear, then $\alpha$ and $1-\alpha$ are each linear functions of the potentiometer setting. By using predetermined potentiometer resistance tapers, $\alpha$ or $(1-\alpha)$ can be made to have any of a wide number of functional relationships to the potentiometer setting. Thus, values of $\alpha$ near unity, which must be known most accurately to have sufficient accuracy in the form $(1-\alpha)$ for common emitter gain computations, can be spread over a wider scale range than the lower values of $\alpha$ in order to give more precise readings of $\alpha$ near unity.

Figure 3:
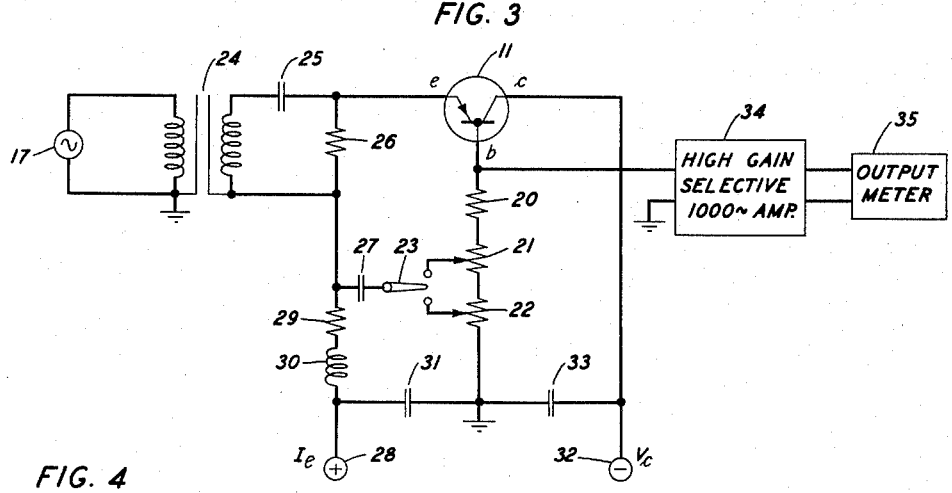
Fig. 3 illustrates an embodiment of the invention in which a pair of potentiometers are used between the collector and base electrodes of the transistor in order to give a dual range of readings.

The embodiment of the invention shown in Fig. 3 is an example of another way of providing more accurate readings of $\alpha$ near unity than in other portions of the measuring range. For completeness, D.-C. biasing circuits are shown in Fig. 3 as well as the necessary A.-C. circuitry. In Fig. 3, the resistance $R_1$ is built out with a fixed resistor 20. Instead of a single potentiometer 19, however, two potentiometers 21 and 22 are used for different ranges of $\alpha$, with a selector switch 23 to choose the movable contact of either potentiometer for the emitter signal current return. By way of example, resistor 20 may have a resistance of 100 ohms and potentiometers 21 and 22 resistances of 100 and 25 ohms, respectively. When the 25 ohm potentiometer 22 is used, $R_2$ varies from zero to 25 ohms while $R_1+R_2$ (the total "potentiometer" resistance $R_p$) is fixed at the sum of the resistances of resistor 20 and potentiometers 21 and 22. $R_1$ varies from 200 to 225 ohms, making the range of $\alpha$ measurements on potentiometer 22 from $$\frac{200}{225} \text{ or } 0.889$$

to $$\frac{225}{225} \text{ or } 1.000$$

When the 100 ohm potentiometer 21 is used, the range of $\alpha$ measurements is from 0.444 to 0.889. Thus approximately the same linear scale is used to cover a 0.111 range of $\alpha$ in the vicinity of unity as to cover a 0.444 range at the lower values of $\alpha$. This feature of the invention gives a 4 to 1 increase in precision in the reading of $\alpha$ in the vicinity of unity. By making potentiometer 22 even lower in resistance or by making the total resistance in the transistor base circuit larger, the precision of the determination of $\alpha$ near unity may be increased even more, the only physical limitation being that set by the maximum sensitivity of the null detector as limited by noise.

The remainder of the embodiment of the invention illustrated in Fig. 3 includes a double-shielded transformer 24 connected in the signal input circuit to attenuate circulating ground currents at the signal frequency which might otherwise flow in $R_2$ and add an error to the current $\alpha i_e$ flowing in $R_2$. Such a transformer is particularly effective in increasing the accuracy of measurement at high precision with an instrument of the type under consideration. A blocking capacitor 25 is connected between the high side of the output winding of transformer 24 and the emitter electrode of transistor 11 in order to prevent emitter biasing current from flowing in the transformer secondary. A shunt resistor 26 is connected between the emitter electrode of transistor 11 and the other side of the transformer secondary in order to provide a D.-C. path for the transistor emitter biasing current. A coupling capacitor 27 is connected between resistor 26 and the range selector switch 23 to provide a very low impedance return path for the emitter signal current and to block D.-C. from the switch.

The emitter electrode of transistor 11 in Fig. 3 is provided with a substantially constant current bias by a D.-C. source 28 which is poled to bias the emitter in the forward direction and connected through a resistor 29 and an inductance coil 30 to resistor 26. Resistor 29 and coil 30 combined to provide a biasing current path of sufficiently high impedance to avoid appreciable shunting of $R_2$, the resistance between the working potentiometer movable contact and ground. The collector electrode of transistor 11 is supplied with a substantially constant voltage bias by a D.-C. source 32 which is poled to bias the collector in the reverse direction and connected directly thereto. A by-pass capacitor 33 is returned to ground from the collector electrode of transistor 11.

In the embodiment of the invention shown in Fig. 3, the voltmeter 18 of Figs. 1 and 2 is replaced by a high-gain frequency-selective amplifier 34 and an indicating meter 35. Amplifier 34 is tuned to the frequency of signal generator 17 (which may be, by way of example, 1000 cycles), permitting the detection of extremely low-level signals between the base electrode of transistor 11 and ground. In this connection, it should be noted that the transistor collector electrode is effectively shunted to ground by collector by-pass capacitor 33.

In the operation of the alpha measuring set illustrated in Fig. 3, the desired range is selected by range selector switch 23, the working potentiometer is adjusted until output meter 35 reads zero, and alpha is read directly from the setting of the potentiometer movable contact, both potentiometers 21 and 22 having previously been calibrated against a standard potentiometer.

An important advantage of the embodiment of the invention shown in Fig. 3 is that contact noise in the working potentiometer is in series with the input signal and is, therefore, balanced to a null at the input of the detector in the same manner as the measuring signal. This is an important consideration in the precision and accuracy available with the circuit featured by the invention, particularly at low signal levels. In addition, a highly selective null detector may be used to reduce the noise band of the detector amplifier 34 and permit still lower level null balances. Because of these advantages, it is possible to make precise and accurate measurements of junction transistor alphas with embodiments of the invention like that of Fig. 3 at emitter bias currents as low as 10 microamperes.

Figure 4:
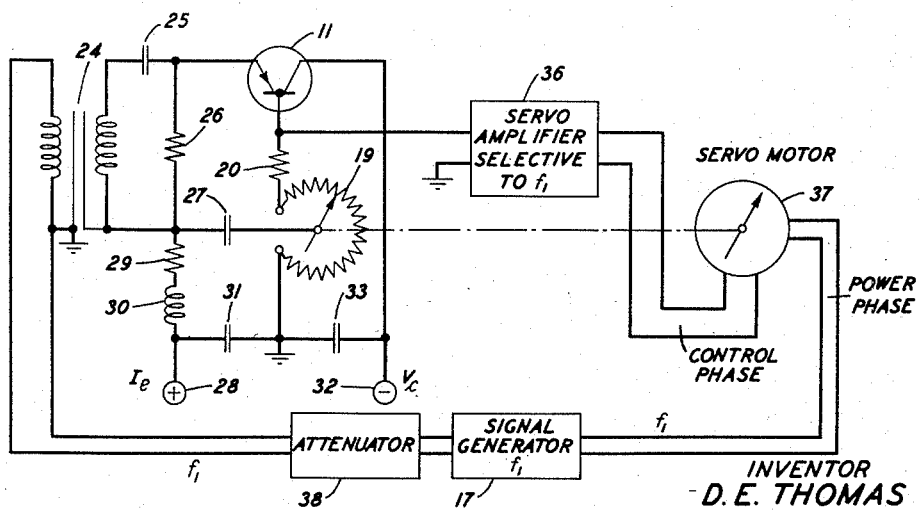
Fig. 4 illustrates an embodiment of the invention adapted for automatic operation.

An embodiment of the invention in which the previously-calibrated potentiometer 19 is set automatically to provide a null output is illustrated in Fig. 4. In the arrangement shown in Fig. 4, the detector or null amplifier 34 of Fig. 3 is replaced by a servo amplifier 36 selective to the signal generator frequency $f_1$. The output of servo amplifier 36 feeds the control phase of a two-phase A.-C. servomotor 37. The reference or power phase of servomotor 37 is fed from the same signal generator 17 which supplies the input signal to the transistor. This is necessary in order to tie both the frequency and phase of the transistor input signal to those of the power phase of the servo motor. Since the amount of power required to operate servomotor 37 is considerably greater than that used to provide a signal at the transistor emitter electrode, an attenuator 38 is connected between signal generator 17 and the primary of transformer 24. The shaft of servomotor 37 is angular-position-coupled to the shaft of the balancing potentiometer 19 of the measuring set. A signal at the input of servo amplifier 36 drives servomotor 37 until the input signal becomes zero. This balances potentiometer 19 and gives an automatic indication of the transistor current amplification factor in terms of the potentiometer setting. By connecting an analog to digital converter to the balancing potentiometer, the values of $\alpha$ may be indicated in digital form and automatically printed. The printed information may then be correlated with numbers stamped on individual transistors for a printed record of the values of alpha for a large number of tested transistors.

The automation potential of the alpha measuring set shown in Fig. 4 may be extended further by mechanically connecting a commutator 39 to the balancing potentiometer or servomotor shaft, as shown in Fig. 5. Depending upon the position of the movable contact of potentiometer 19 at the null balance point or, in other words, upon the value of $\alpha$ for the transistor being tetsted, a wiping arm 40 of commutator 39 is electrically connected to one of the several commutator segments. Each of these segments controls the opening to a hopper by means of solenoid 41, as illustrated in Fig. 5, so that when the transistor being tested is dropped into a trough leading to the various hoppers, it falls into the hopper selected by the commutator 39. Transistors are thereby measured and sorted automatically in accordance with the values of $\alpha$ measured at any selected operating point.

Fig. 6 shows an embodiment of the invention in which the measuring potentiometer 19 is connected mechanically to one axis of an X—Y recorder 42. When an operating or ambient condition for the transistor 11 is varied and the data defining this condition fed into the second axis of the recorder, then because of the automatic balancing of the alpha measuring set, a direct-reading graph is made on the X—Y recorder showing $\alpha$ as a function of the independent variable fed to the second axis. The illustrated arrangement is simpler, less costly, and more versatile than the electronically swept alpha versus emitter current sweepers found in the prior art. In addition, it is more precise and gives a permanent record of the $\alpha$ characteristic of the transistor under test without the use of a camera.

It is to be understood that the above-described arrangements are illustrative of the application of the principles of the invention. Numerous other arrangements may be devised by those skilled in the art without departing from the spirit and scope of the invention.

What is claimed is:

1. In combination with a transistor having an emitter electrode, a collector electrode, and a base electrode, an arrangement for measuring the current amplification factor of said transistor which comprises means to supply direct operating potentials to said electrodes, a potentiometer having a pair of fixed terminals connected to a first and a second of said electrodes respectively and a movable contact, an input signal source connected between the third of said electrodes and said movable contact, and null-reading voltage measuring means connected between said first and second electrodes.

2. In combination with a transistor having an emitter electrode, a collector electrode, and a base electrode, an arrangement for measuring the current amplification factor of said transistor which comprises means to bias said emitter electrode in the forward direction, means to bias said collector in the reverse direction, a potentiometer having a resistance arm connected between said collector and base electrodes and a movable contact on said resistance arm, an input signal source connected between said emitter electrode and said movable contact, and null-reading voltage measuring means connected between said collector and base electrodes substantially in parallel with said resistance arm, whereby the current amplification factor of said transistor is represented by the position of said movable contact on said resistance arm at which a null indication is obtained on said voltage measuring means and the accuracy of representation is independent of fluctuations in the amplitude of the signal produced by said source.

3. In combination with a transistor having an emitter electrode, a collector electrode, and a base electrode, an arrangement for measuring the current amplification factor of said transistor which comprises means to bias said emitter electrode in the forward direction, means to bias said collector electrode in the reverse direction, a plurality of potentiometers each having a resistance arm and a movable contact thereon, the resistance arms of said potentiometers having respectively different values of resistance, circuit means connecting the resistance arms of said potentiometers in series between said collector and base electrodes, switching means connecting a movable contact selectively to respectively different ones of said potentiometer movable contacts, an input signal source connected between said emitter electrode and said switching means movable contact, and null-reading voltage measuring means connected between said collector and base electrodes substantially in parallel with said resistance arms, whereby the current amplification factor of said transistor is represented by the position of the said potentiometer movable contact to which said switching means movable contact is connected on its said resistance arm, and each of said potentiometers provides a respectively different range of measurements.

4. A combination, in accordance with claim 3, in which the said resistance arm electrically most remote from said base electrode has the smallest resistance of all of said resistance arms, whereby the precision in reading the measured value of the current amplification factor of said transistor is greatest in the vicinity of unity.

5. In combination with a transistor having an emitter electrode, a collector electrode, and a base electrode, an arrangement for measuring the current amplification factor of said transistor which comprises means to bias said emitter electrode in the forward direction, means to bias said collector electrode in the reverse direction, a potentiometer having a resistance arm connected between said collector and base electrodes and a movable contact on said resistance arm, a substantially single frequency input signal source connected between said emitter electrode and said movable contact, null-reading voltage measuring means, and frequency-selective amplifying means tuned to pass the frequency of said source having its input connected substantially across said resistance arm and its output connected to said voltage measuring means, whereby the current amplification factor of said transistor is represented by the position of the said movable contact on said resistance arm at which a null indication is obtained on said voltage measuring means even for low level signals from said source.

6. In combination with a transistor having an emitter electrode, a collector electrode, and a base electrode, an arrangement for measuring the current amplification factor of said transistor which comprises means to bias said emitter electrode in the forward direction, means to bias said collector electrode in the reverse direction, a potentiometer having a resistance arm connected between said collector and base electrodes and a movable contact on said resistance arm, a signal generator, an alternating current servo motor having a reference phase, a control phase, and a shaft position-coupled to said potentiometer movable contact, means connecting the reference phase of said servo motor to said signal generator, and means connecting the control phase of said servomotor across said potentiometer resistance arm, whereby the current amplification factor of said transistor is represented by the position of said movable contact on said resistance arm when said servomotor comes to rest.

7. A combination, in accordance with claim 6, which includes a drum-type recorder having its axis angular-position-coupled to the shaft of said servomotor and marking means movable axially of said recorder and position-coupled to an operating parameter of said transistor.

8. A combination, in accordance with claim 6, which includes a commutator having a plurality of segments and a contact arm angular-position to the shaft of said servomotor, a plurality of hoppers corresponding to respective ones of said commutator segments, and means responsive to the position of said shaft and said potentiometer movable contact to open the one of said hoppers corresponding to the rest position of said potentiometer movable contact.

References Cited in the file of this patent

The Proceedings of the Institute of Electrical Engineers, vol. 101, No. 73, September, 1954, pp. 288–316.